(12) United States Patent
Shore et al.

(10) Patent No.: US 6,752,710 B2
(45) Date of Patent: Jun. 22, 2004

(54) CLOSED CAPTURE EMISSION SYSTEM

(75) Inventors: Christopher R. Shore, Hamilton (CA); Michael B. Shaw, Oakville (CA)

(73) Assignee: Dana Canada Corporation, Oakville (CA)

( * ) Notice: Subject to any disclaimer, the term of this patent is extended or adjusted under 35 U.S.C. 154(b) by 101 days.

(21) Appl. No.: 10/104,434

(22) Filed: Mar. 22, 2002

(65) Prior Publication Data

US 2003/0015090 A1 Jan. 23, 2003

(30) Foreign Application Priority Data

Mar. 22, 2001 (CA) ............................................ 2341802

(51) Int. Cl.[7] .............................................. B08B 17/00
(52) U.S. Cl. .......................... 454/49; 266/44; 266/158
(58) Field of Search ............................. 454/49, 61, 67; 266/44, 158, 159

(56) References Cited

U.S. PATENT DOCUMENTS

| | | | |
|---|---|---|---|
| 3,224,170 A | * 12/1965 | Iwanaga et al. | ............... 96/342 |
| 3,617,338 A | * 11/1971 | Caiola et al. | ............... 427/210 |
| 3,653,650 A | * 4/1972 | Iwao et al. | ................... 75/385 |
| 3,823,531 A | 7/1974 | Crawley | |
| 4,026,688 A | 5/1977 | Patterson | |
| 4,192,486 A | * 3/1980 | Ueda et al. | ................... 266/44 |
| 4,330,372 A | * 5/1982 | Cairns et al. | ................. 201/41 |
| 4,617,033 A | 10/1986 | Strang | |
| 4,767,320 A | 8/1988 | Sasaki | |
| 4,787,254 A | 11/1988 | Duckworth | |
| 4,834,020 A | * 5/1989 | Bartholomew et al. | ..... 118/719 |
| 4,846,647 A | 7/1989 | Stewart et al. | |
| 5,095,811 A | 3/1992 | Shutic et al. | |
| 5,154,513 A | 10/1992 | Beer | |
| 5,359,946 A | 11/1994 | Asoh et al. | |
| 5,425,492 A | 6/1995 | Thode | |
| 5,472,135 A | 12/1995 | Taniguchi et al. | |
| 5,481,087 A | 1/1996 | Willemen | |
| 5,518,446 A | 5/1996 | Jacob | |
| 5,573,688 A | 11/1996 | Chanasyk et al. | |
| 5,641,341 A | 6/1997 | Heller et al. | |
| 5,820,456 A | 10/1998 | Nelson | |

FOREIGN PATENT DOCUMENTS

| | | |
|---|---|---|
| DE | 44 34 780 | 10/1995 |
| EP | 0 999 007 A | 5/2000 |
| JP | 7-43080 | * 2/1995 |

OTHER PUBLICATIONS

"Fluid Meters: Their Theory and Applications," The American Society of Mechanical Engineers, 5th Ed., 1959, 46–49.
European Patent Office; International Search Report for International Application No. PCT/CA02/00383 mailed Nov. 14, 2002.

* cited by examiner

Primary Examiner—Harold Joyce
(74) Attorney, Agent, or Firm—Ridout & Maybee LLP

(57) ABSTRACT

An apparatus and method for capturing the emissions from a controlled atmosphere treatment apparatus of the type having at least one, and usually several, controlled atmosphere zones therein and exhaust stacks that deliver environmentally unfriendly emissions therefrom. Nozzles are attached to the exhaust stacks from the various controlled atmosphere zones in the treatment apparatus. The nozzles accelerate the exhaust flow from the exhaust stacks, provide a means for measuring the flow from the exhaust stacks, yet maintain the mass flow rates from the exhaust stacks at predetermined levels. The flow from the nozzles is directed through closed conduits to an optional filter and an exhaust fan that provides suction to draw the exhaust flow through the nozzles.

18 Claims, 6 Drawing Sheets

CLOSED CAPTURE EMISSION SYSTEM

This application claims priority to Canadian Application No. 2,341,802 filed Mar. 22, 2001.

BACKGROUND OF THE INVENTION

This invention relates to controlled atmosphere treatment processes that produce emissions that are environmentally unfriendly, and in particular, to the capture and handling of these emissions.

There are many types of apparatus for the treatment or processing of articles under controlled atmospheric conditions, such as an inert atmosphere, or other special temperature or atmospheric conditions. One category of these types of systems is what may be referred to as an open system, where the materials to be processed are fed on a conveyor through an enclosure that contains one or more zones where particular atmospheric conditions are maintained. After the materials or articles are processed in these controlled atmospheric conditions, the conveyor transfers them out of the enclosure. The conveyor can be continuous. Often, the enclosure has open or semi-open inlet and outlet openings where the conveyor passes through. The inlet and outlet openings are of sufficiently small cross-sectional area, or are fitted with flexible or movable curtains or labyrinth seals, so that a slight positive pressure is maintained inside the apparatus to continuously or intermittently purge the process chamber inside the apparatus. The control zones also usually have exhaust stacks for the venting or removal of emissions or unwanted by-products or purge gases resulting from the processing of the materials or articles treated in the apparatus.

Controlled atmosphere treatment processes depend on maintaining a specific level of atmosphere purity in the enclosure (process chamber) for process quality. To do this, inlet gas flows are adjusted to provide sufficient purge rates within the enclosure and through the exhaust stacks. The inlet flow rate is established to exclude infiltration of ambient atmosphere (air, moisture) into the enclosure, and also to sweep out process by-products or emissions. There are conflicting demands for a sufficiently low inlet purge rate so as to maintain a uniform distribution of pure gas within the enclosure (and for cost minimization), and a sufficiently high exhaust rate to remove process emissions. Therefore, a delicate balance must be maintained between the make-up atmosphere being supplied to the apparatus and the exhaust flows being removed from the apparatus.

Examples of the type of process or apparatus under consideration include controlled or zoned atmosphere furnaces or ovens for the soldering of electronic components, for sintering powder metal components, or for the brazing of articles such as metal heat exchangers. An example of this type of furnace used for soldering is shown in U.S. Pat. No. 5,573,688 issued to Chanasyk et al. In this type of furnace, an inert atmosphere is used, such as nitrogen, and successive zones are provided in the furnace to heat the articles gradually until they are soldered and then cool them down before emerging from the oven. In sintering or brazing furnaces, especially for oxidation sensitive components such as aluminum heat exchangers, specific temperature profiles, product feed rates and oxygen concentrations inside the various zones must be precisely controlled to provide the necessary protective or reducing atmospheres required for brazing, and to produce high quality brazed or sintered products. For example, in brazing aluminum heat exchangers, oxygen concentrations must be maintained in the low parts per million range by metering the supply and exhaust rate of the nitrogen protective gas used in the furnace. The purge rate of the protective gas must be sufficient to remove residual water vapour entrained by the product load, and any residual press lubricants on the product surfaces that will be volatized as the product is heated in the process (referred to as thermal degreasing), along with other process materials or by-products. The exhausted purge gas may carry contaminates, metals and oils from the furnace or process enclosure through the exhaust stacks in the form of particulates, vapors and gases. This may also be referred to as thermal degreasing of the components to be processed in the furnace. In a typical brazing process, the emissions can contain metals such as aluminum, cadmium, chromium, lead, bismuth, tin, iron, copper, magnesium, nickel and zinc, and also volatile organic compounds, such as thermal decomposition products including benzene, ethylbenzene, toluene, xylenes and others, and brazing fluxes or process by-products. Under current environmental regulations, it may not be possible simply to exhaust these environmentally unfriendly emissions to the atmosphere. It may be necessary to collect them and treat or dispose of them properly.

One method that has been used to collect these environmentally unfriendly emissions in the past has been to place an exhaust hood over each exhaust stack and use an exhaust fan or other suction device to draw the exhaust stack flow into the exhaust hoods. However, the efficiency of this type of captured device is very poor. Sometimes, an ejector is used in the furnace exhaust stacks to help remove the emissions from the furnace and direct them to the exhaust hoods, but this does not help very much and it requires an extra flow of inert gas to operate the ejectors, since air cannot be used or the oxygen in the air may infiltrate the controlled zones through the exhaust stack. It has not been thought possible in this type of system to directly connect the furnace exhaust stacks to the exhaust hoods to ensure full capture of the exhaust emissions, because the flow rates are very low and the inert gas inlet and exhaust removal cannot be controlled accurately enough to maintain the desired controlled atmosphere inside the furnace without causing infiltration from outside the furnace.

The present invention is able to provide a directly coupled exhaust system by providing metering devices connected between the furnace exhaust stacks and a suction source and controlling the suction applied to the metering devices to maintain the inlet flow thereto generally equal to desired predetermined flow rates through the exhaust stacks. In so doing, a uniform microclimate of undisturbed atmosphere can be maintained within the process enclosure at a uniform positive pressure with respect to the ambient atmosphere.

SUMMARY OF THE INVENTION

According to one aspect of the invention, there is provided an exhaust system for a controlled atmosphere treatment apparatus having at least one internal zone with predetermined atmospheric conditions therein and an exhaust stack for a predetermined exhaust flow from the zone. The system comprises a metering device attached in fluid communication with the exhaust stack. The metering device has a converging entrance portion defining an inlet, a reduced diameter outlet portion defining an outlet, and a predetermined relationship between the inlet and outlet flow therethrough. Suction means is attached to communicate with the metering device outlet for drawing exhaust flow through the metering device. Also, suction control means is operably associated with the suction means for maintaining the outlet flow in the metering device such that the inlet flow thereto is generally equal to the predetermined exhaust flow from the internal zone.

According to another aspect of the invention, there is provided a method of capturing emissions from a controlled atmosphere treatment apparatus of the type having an internal zone with predetermined atmospheric conditions therein and an exhaust stack for a predetermined exhaust flow from the zone. The method comprises the steps of increasing the flow velocity of the exhaust flow from the exhaust stack while maintaining constant the mass flow rate through the exhaust stack. The increased velocity flow from the exhaust stack is delivered to a remote location. Also, the temperature and velocity of the exhaust flow is controlled during the delivery step so as to prevent condensation and precipitation of volatiles and particulate matter from the exhaust flow.

BRIEF DESCRIPTION OF THE DRAWINGS

Preferred embodiments of the invention will now be described, by way of example, with reference to the accompanying drawings, in which.

DESCRIPTION OF THE PREFERRED EMBODIMENTS

Figure 1:
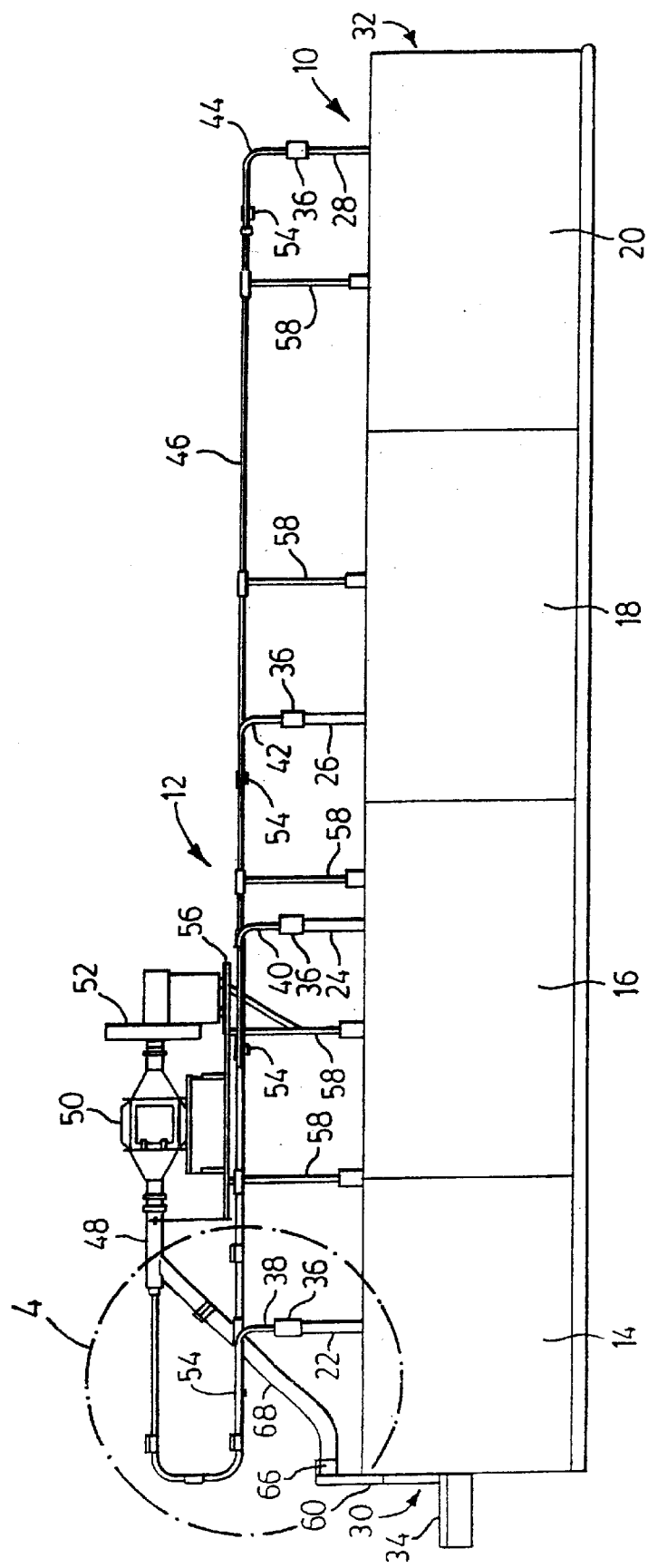
FIG. 1 is an elevational schematic view of a brazing oven or furnace with a preferred embodiment of an exhaust system according to the present invention installed thereon.
Figure 2:
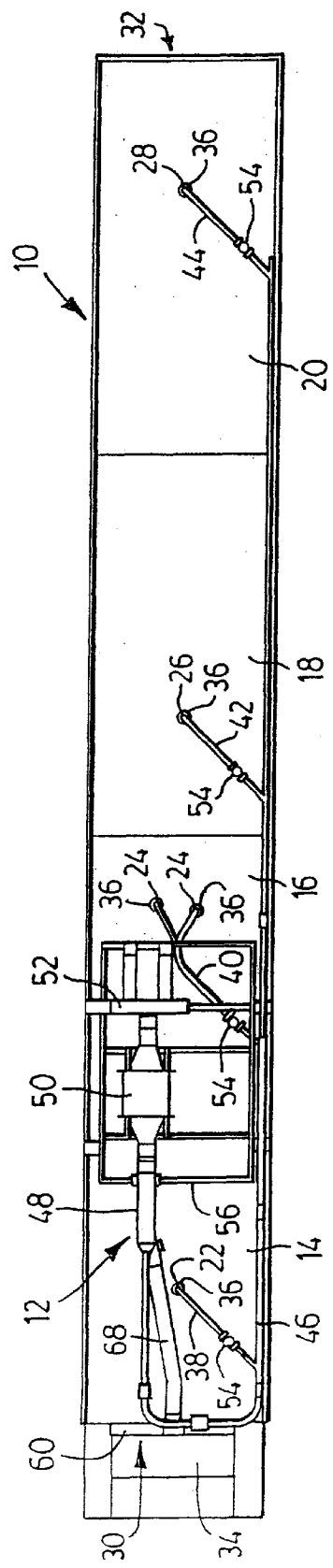
FIG. 2 is a schematic plan view of the brazing oven shown in FIG. 1.

Referring firstly to FIGS. 1 and 2, a controlled atmosphere treatment apparatus such as a soldering or brazing furnace or oven is generally indicated by reference numeral 10. A preferred embodiment of an exhaust system for furnace 10 is generally indicated by reference numeral 12. This preferred embodiment is particularly useful for brazing aluminum components. A different type of furnace may be used, for example, for soldering or sintering or brazing other metals. Furnace 10 has a plurality of internal zones 14, 16, 18 and 20 having predetermined atmospheric conditions therein, such as an inert gas atmosphere, which is usually maintained at a slight positive pressure relative to the ambient conditions. An example in a brazing furnace would be a protective gas atmosphere with perhaps some traces of gaseous hydrocarbons, perhaps up to 1% moisture and less than 5 to 6 ppm of oxygen. The temperatures in the various zones 14 to 20 are predetermined as well and again, in a brazing furnace the temperatures would gradually increase in the initial zones until brazing temperatures were reached and then decrease in the latter zones to cool down the products being brazed. Typical conditions in a brazing furnace are indicated in more detail below.

The internal zones of furnace 10 also have exhaust stacks 22, 24, 26 and 28. Exhaust stack 24 is actually a pair of laterally spaced-apart exhaust stacks. It will be appreciated that furnace 10 can have any number of controlled atmosphere zones or just a single zone, and each zone can have one or more exhaust stacks.

Figure 3:
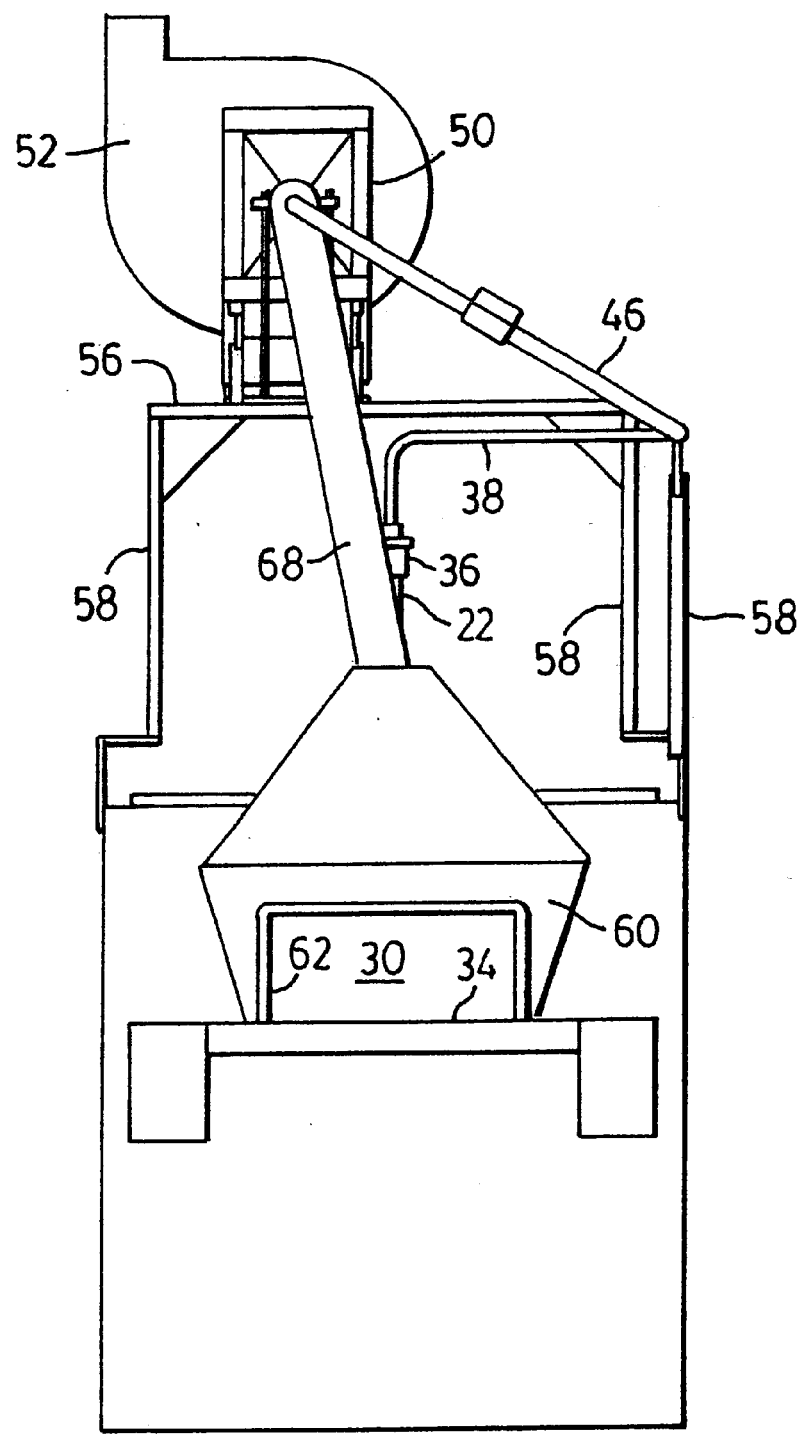
FIG. 3 is an enlarged left end view of the brazing furnace and exhaust system shown in FIG. 1.

Furnace 10 has an entrance opening 30 (see FIG. 3) and an exit opening 32, and a continuous conveyor 34 runs through furnace 10 to pass the materials or articles to be treated in furnace 10 through the successive controlled atmosphere zones 14 to 20.

The controlled atmosphere treatment apparatus or brazing furnace 10 described thus far can be any configuration desired and use any process gases or atmospheric conditions in the various zones, as desired. A mixture of gases, or doped gases, are possible in some zones. For example, a small amount of hydrogen might be added to the nitrogen, or a gaseous flux might be injected into the nitrogen gas, especially for brazing metals other than aluminum.

Each of the exhaust stacks 22 to 28 has a metering device in the form of a flow nozzle 36 attached thereto in fluid communication with the exhaust stack. Flow conduits or pipes 38, 40 (bifurcated), 42 and 44 connected to respective nozzles 36 deliver the exhaust flows passing through nozzles 36 to a common header 46, which in turn delivers the collective exhaust flows to an inlet manifold 48. Inlet manifold 48 is connected to an optional multi-staged filter 50, which may include a mist eliminator, a pre-filter, an intermediate filter, a HEPA filter and finally an activated carbon bed. An exhaust fan 52 is connected to the outlet of filter 50 and provides the suction means attached to metering devices or nozzles 36 to draw the exhaust flows through the flow nozzles 36. A suitable exhaust fan for the preferred embodiments described herein would be rated at about 350 cfm at 10 inches WG (10 $m^3$/min at 69 Pa), but may vary depending on the number of exhaust stacks and the optional use of one or more fume hoods, as described further below. Each of the flow conduits 38, 40, 42 and 44 includes a globe valve 54 which acts as suction control means operably associated with exhaust fan or suction means 52 for maintaining a desired outlet flow from the metering devices or nozzles 36. As described further below, the nozzles 36 are designed such that controlling the outlet flow also controls the inlet flow thereto and this inlet flow is set so that the mass flow rate through the nozzles 36 is generally equal to the predetermined exhaust flow rates through stacks 22 to 28 from respective zones 14 to 20.

A suitable support structure for inlet manifold 48, filter 50, exhaust fan 52 and header 46 is provided in the form of a frame 56 and upright members 58, but any other type of support structure could be used, as desired.

An optional fume hood 60 is located at the entrance opening 30 of furnace 10. Referring, in particular, to FIG. 3 and FIGS. 8 to 10, fume hood 60 includes an inverted U-shaped entrance area 62 that fits around the inlet opening 30 of furnace 10. Entrance area 62 defines a narrow entrance slot 64 which has a width, typically, of about 0.64 centimeters. The width of entrance area 62 is about 0.5 meters and the height is about 0.25 meters. This provides a capture velocity through slot 64 of about 1 meter per second with a hood flow rate about 8000 to 9000 liters per minute. This minimizes the withdrawal of the controlled atmosphere through entrance opening 30, but is sufficient to capture efficiently the emissions exiting from entrance opening 30.

Fume hood 60 has an exhaust outlet 66 which is connected through a duct 68 to inlet manifold 48 to provide suction to fume hood 60. It will be noted that duct 68 is connected to inlet manifold 48 down stream of the main capture system header 46 and converges with the flow from nozzles 36 at the inlet to filter 50 or exhaust fan 52. This prevents the relatively cool flow through duct 68 from cooling the flow from the exhaust stacks 22 to 28, which otherwise might cause condensation and subsequent fouling to occur in the capture system piping.

If desired a fume hood 60 could be located at the furnace exit opening 32 instead of, or in addition to, the fume hood 60 at entrance opening 30. Also, flow nozzles 36 could be attached to the outlets of the entrance and exit fume hoods 60, especially in furnaces that do not have exhaust stacks spaced along the length of the furnace muffle.

Figure 5:
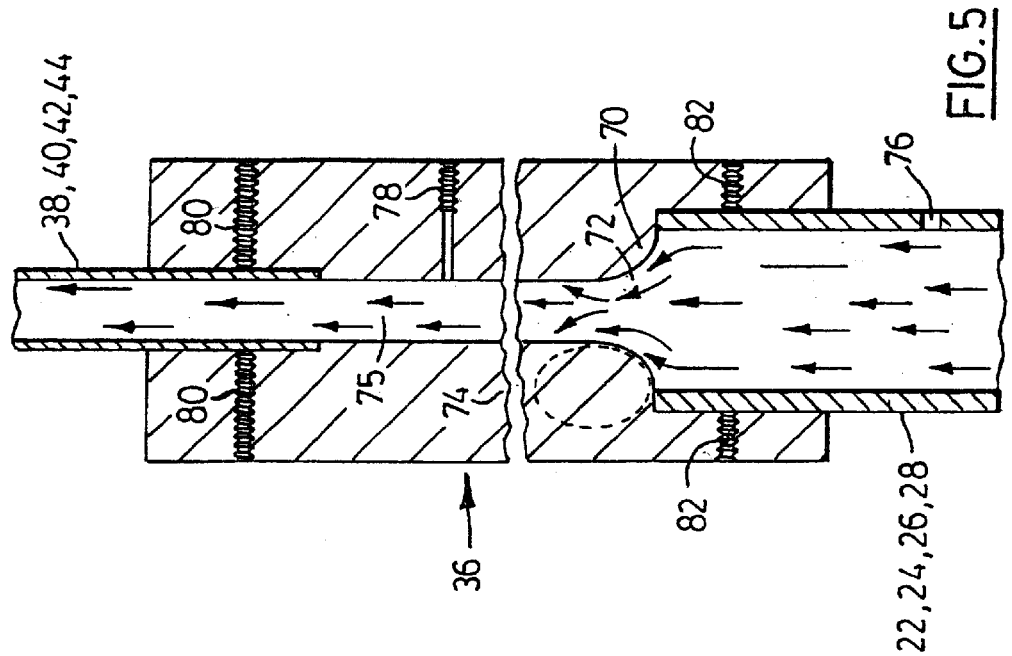
FIG. 5 is an diagrammatic, cross-sectional view of a flow nozzle as used in the embodiment of FIGS. 1 to 3.
Figure 4:
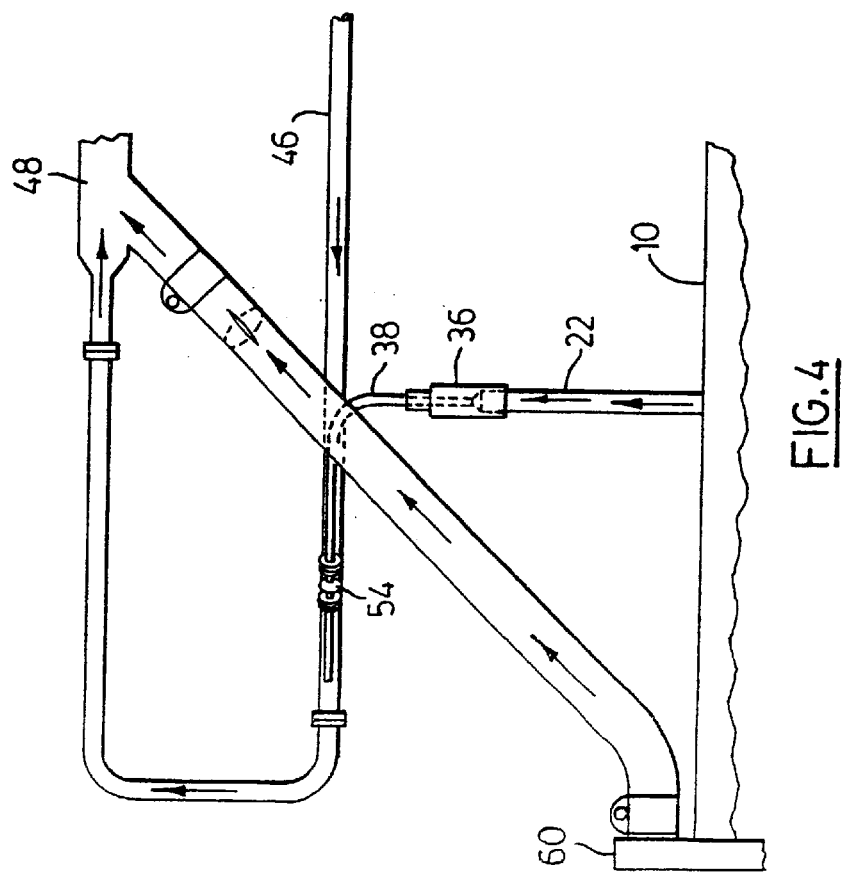
FIG. 4 is an enlarged scrap view of the area of FIG. 1 indicated by circle 4.
Figure 6:
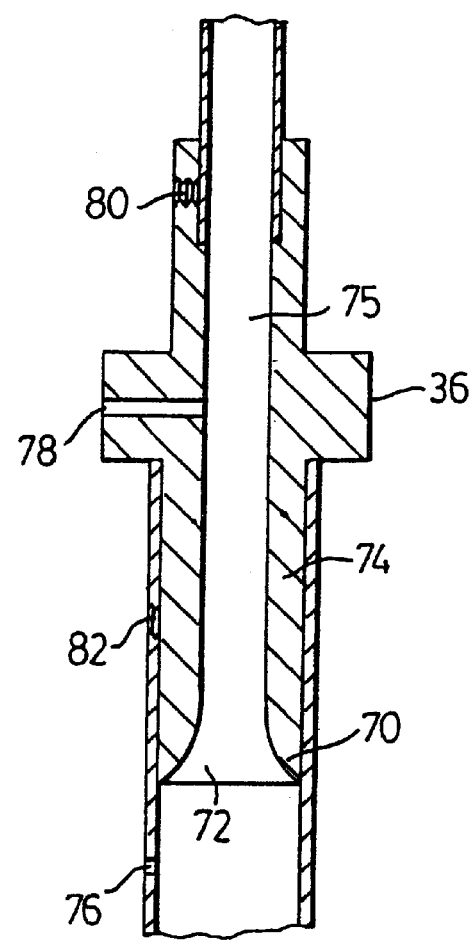
FIG. 6 is an enlarged, cross-sectional view of an actual flow nozzle shown as installed in the exhaust system of FIGS. 1 to 4.
Figure 7:
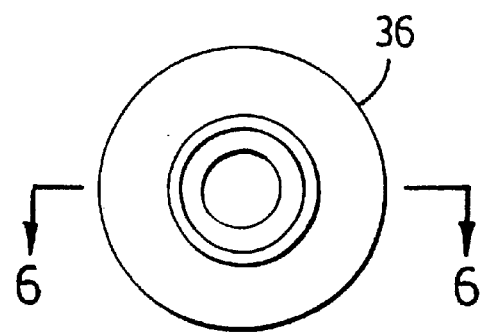
FIG. 7 is a bottom view of the flow nozzle as shown in FIG. 6.
Figure 8:
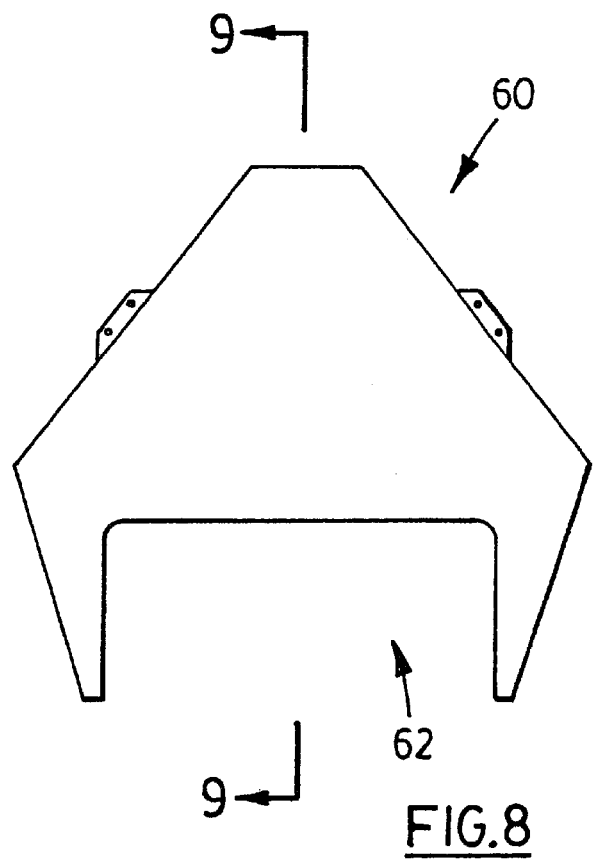
FIG. 8 is an enlarged view of an optional entrance fume hood of the exhaust system of the present invention.
Figure 9:
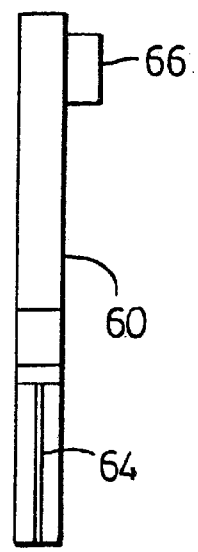
FIG. 9 is a sectional view taken along lines 9—9 of FIG. 8.
Figure 10:
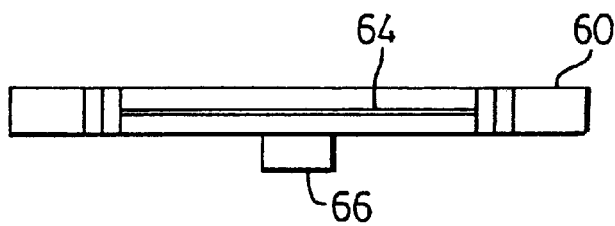
FIG. 10 is a bottom view of the fume hood as shown in FIG. 8.

Referring next to FIGS. 5 to 7, nozzles 36 will be described in further detail. Nozzle 36 is a nozzle-type fluid flow meter that conforms to the standard for ASME (American Society of Mechanical Engineers) long-radius flow nozzles. As such, the nozzle has a converging entrance portion in the shape of a partial elliptical curve to define a nozzle inlet 72. Nozzle 36 also has a reduced diameter outlet portion 74 defining a nozzle outlet 75. There is a predetermined relationship between inlet and outlet flow through inlet 72 and outlet 75 which is in accordance with the following formula:

$$Q = CAY\sqrt{\frac{\Delta P}{\rho(1-\beta^4)}}$$

where:
  Q=volumetric flowrate, $m^3/S$
  C=discharge coefficient
  A=cross-sectional area of the nozzle throat
  Y=expansion factor
  $\Delta P$=pressure differential between throat and inlet, Pa
  $\rho$=fluid density, $kg/m^3$
  $\beta$=ratio of nozzle throat diameter to inlet pipe diameter (beta factor)

Means are also provided for measuring the flow rate through the nozzles and this includes a pressure tap 76 located adjacent to the entrance of the nozzle and a pressure tap 78 located about 5 diameters downstream of inlet 72. The differential pressure $\Delta P$ is determined by the pressure differential between pressure taps 76, 78, and this $\Delta P$ is used in the formula above to determine the flow rate through nozzles 36. When the pressure at pressure tap 78 is found to be the same as the furnace ambient air conditions, then the atmosphere pressure can be used as a reference, thereby, eliminating the need for pressure tap 78.

As seen best in FIG. 5, nozzle 36 can be mounted over exhaust stacks 22 to 28 and flow conduits 38 to 44 can be slid into the upper end of nozzle 36. Tapped holes 80, 82 accommodate set screws for fastening the assembly together. FIGS. 6 and 7 show an alternate embodiment where the exhaust stacks 22 to 28 fit over the lower end portion of nozzles 36.

Exhaust stacks 22, 24, 26 and 28 have a typical inside diameter of about 3.5 to 3.8 centimeters, and nozzle outlet or throat 75 has a typical inside diameter of about 1.7 to 2 centimeters. This produces a $\beta$ ratio of about 0.48, which gives a sufficiently high pressure drop in nozzle 36 to give reasonably good resolution for the flow measurement through nozzle 36.

As will be appreciated, the reduced diameter throat 75 of nozzle 36 accelerates and increases the velocity of the flow from exhaust stacks 22 to 28. Flow conduits 38 to 44 and header 46 are dimensioned to maintain this flow velocity to prevent precipitation of particulate matter and cooling of the exhaust flow which could cause condensation in the flow conduits leading to exhaust fan 52. Exhaust stacks 22 to 28 and the flow conduits leading therefrom to exhaust fan 52 may be wrapped with insulation to maintain the temperature therein and help prevent condensation. The temperature of the exhaust flow through flow conduits 38 to 44 and header 46 should be maintained above the dew point of the exhaust flow, which is typically about 140° C.

In the operation of a typical aluminum brazing furnace 10 with a closed emission capture exhaust system 12 as described above, the temperatures inside the controlled atmosphere zones 14 to 20 vary between about 200° C. and 800° C. About 1200 liters per minute of nitrogen gas is supplied to furnace 10 to make up for the exhaust flows through exhaust stacks 22 to 28 and the out flows through inlet 30 and outlet 32. The out flow from entrance opening 30 ranges between about 100 and 150 liters per minute at a temperature between 100 and 150° C. at an average velocity between 1.8 and 2.4 meters per second. The flow through the exhaust stacks typically ranges between 80 and 300 liters per minutes at a temperature between 80 and 450° C. with a velocity of 3 to 4.5 meters per second and a mass flow rate of 1.8 to 2.5 grams per second. The flow velocity exiting nozzles 36 ranges between 9 and 23 meters per second with a differential pressure between about 40 and 250 Pa. Flow through fume hood 60 is about 0.15 to 0.25 cubic meters per second at a temperature of about 50° C. with a slot width of about 0.63 centimeters.

A specific performance example of a typical brazing furnace with nozzles 36 attached thereto is shown in Table A below.

TABLE A

|  | Units | Entrance Exhaust | Zones 3 & 4 | Zone 6 | Exit Exhaust |
|---|---|---|---|---|---|
| Gas Characteristics |  |  |  |  |  |
| Nitrogen | (%) | 99.69 | 99.68 | 99.90 | 99.60 |
| Oxygen | (ppm) | 6 | 6 | 6 | 6 |
| Argon | (ppm) | 0 | 0 | 0 | 0 |
| Carbon Dioxide | (ppm) | 0 | 0 | 0 | 0 |
| Carbon Monoxide | (ppm) | 0 | 0 | 0 | 0 |
| THC (Methane) | (ppm) | 75 | 203 | 1 | 2 |
| Moisture | (%) | 0.30 | 0.30 | 0.10 | 0.40 |
| Molecular Weight | (g/mole) | 27.98 | 27.98 | 28.00 | 27.97 |

TABLE A-continued

|  | Units | Entrance Exhaust | Zones 3 & 4 | Zone 6 | Exit Exhaust |
|---|---|---|---|---|---|
| Metals Concentration | (ug/Rm3) | 387 | 3878 | 2611 | 1295 |
| Operating Characteristics |  |  |  |  |  |
| Temperature | (° C.) | 141.3 | 418.7 | 330 | 80 |
| Density | (kg/m3) | 0.823 | 0.493 | 0.566 | 0.965 |
| Viscosity | (mPa · s) | 0.02244 | 0.03171 | 0.02901 | 0.02001 |
| Stack Diameter | (m) | 0.035 | 0.035 | 0.035 | 0.035 |
| Velocity | (m/s) | 2.32 | 4.52 | 3.87 | 2.41 |
| Act. Volume Flow | (m3/s) | 0.0022 | 0.0043 | 0.0037 | 0.0023 |
|  | (l/min) | 132 | 258 | 222 | 138 |
| Ref. Volume Flow | (Rm3/s) | 0.0015 | 0.0018 | 0.0018 | 0.0020 |
|  | (l/min) | 90 | 108 | 108 | 120 |
| Gas Mass Flow | (g/s) | 1.810 | 2.119 | 2.093 | 2.220 |
| Reynolds No. |  | 2958 | 2444 | 2634 | 4052 |
| Nozzle Design Criteria |  |  |  |  |  |
| Diameter | (m) | 0.017 | 0.017 | 0.017 | 0.017 |
|  | (in.) | 0.656 | 0.656 | 0.656 | 0.656 |
| Density | (kg/m3) | 0.824 | 0.494 | 0.567 | 0.966 |
| Velocity | (m/s) | 10.09 | 19.72 | 16.97 | 10.55 |
|  | (ft/min) | 1986 | 3882 | 3340 | 2076 |
| Beta Ratio | (D2/D1) | 0.4798 | 0.4785 | 0.4778 | 0.4779 |
| Reynolds No. |  | 6171 | 5118 | 5523 | 8488 |
| Alpha Ratio |  | 0.9991 | 0.9979 | 0.9982 | 0.9989 |
| Expansion Factor |  | 0.9995 | 0.9988 | 0.9990 | 0.9993 |
| Discharge Coefficient |  | 0.9312 | 0.9270 | 0.9287 | 0.9384 |
| Diff. Pressure | (Pa) | 91 | 211 | 179 | 116 |

A typical performance example of a fume hood 60 used in a brazing furnace is indicated in Table B below:

TABLE B

| Plenum Slot |  |  |  |  |
|---|---|---|---|---|
| Oven Exfiltration/End | 0.006 | (Rm3/S) | 13.5 | (ft3/min) |
|  | 383 | (1/min) | — | — |
| Capture Velocity | 1.02 | (m/s) | 200 | (ft/min) |
| Capture Distance | 0.267 | (m) | 0.9 | (in) |
| Slot/Face Velocity | 23.22 | (m/s) | 4502 | (ft/min) |
| Slot/Face Length | 104 | (cm) | 41 | (in) |
| Slot/Face Width | 0.63 | (cm) | 0.25 | (ft) |
| Hood Flow | 0.151 | (Rm3/s) | 320 | (ft3/min) |
|  | 9069 | (1/min) | — | — |
| Static Pressure Loss | 576 | (Pa) | 2.31 | (in. WG) |
| Plenum & Take Off |  |  |  |  |
| Plenum Max. Velocity | 11.61 | (m/s) | 2251 | (ft/min) |
| Plenum Depth | 6.35 | (cm) | 2.50 | (in) |
| Duct Diameter | 10.16 | (cm) | 4.00 | (in) |
| Duct Velocity | 11.51 | (m/s) | 2265 | (ft/min) |
| Static Pressure Loss | 20 | (Pa) | 0.08 | (in. WG) |

From the above, it will be appreciated that flow nozzles 36 increase the flow velocity of the exhaust flow from the exhaust stacks while maintaining constant or undisturbed the mass flow rate through the exhaust stacks. This increased flow velocity is delivered from the exhaust stacks to a remote location by an exhaust fan. If a suitable filter is used prior to the exhaust fan, the filtered exhaust flow may possibly be vented indoors. Otherwise, it can be vented outdoors to the atmosphere if this is environmentally acceptable. While the exhaust flow is being delivered from the exhaust stacks to the exhaust fan the temperature and velocity of the exhaust flow is maintained to prevent condensation and precipitation of volatiles and particulate matter from the exhaust flow. If it is desired to change the exhaust flows through the exhaust stacks, the suction applied to the closed conduits connected to the flow nozzles 36 can be adjusted accordingly so that the flow through the nozzles matches the desired flow rate through the exhaust stacks. The suction can be adjusted by measuring the flow rates through the nozzle flow meters 36 and throttling the suction in the conduits connected to the nozzles accordingly using valves 54.

Having described preferred embodiments of the invention, it will be appreciated that various modifications may be made to the structures and methods of operation described above. For example, instead of using ASME long-radius flow nozzles for metering flow nozzles 36, venturi-type fluid flow meters could be used. Also, the metering devices could be orifice plate type fluid flow meters. In these latter instances, the flow meters preferably would have a reduced diameter outlet adapter to increase the flow velocity of the exhaust flows to help prevent precipitation and condensation in the exhaust piping. In furnaces that do not have exhaust stacks along the length of the muffle, but rather have exhaust ducts or fume hoods at either end of the furnace, the nozzles of the present invention could be used just behind or attached to the ducts or fume hoods. For the purposes of this specification, the term exhaust stack is intended to include any type of exhaust outlet or opening in a controlled atmosphere furnace or enclosure.

It will also be appreciated that the controlled atmosphere treatment apparatus of the present invention can have any number of controlled atmosphere zones, including even a single controlled atmosphere zone. This invention can be applied to continuous, semi-continuous, or even batch furnaces.

As will be apparent to those skilled in the art in the light of the foregoing disclosure, many alterations and modifications are possible in the practice of this invention without departing from the spirit or scope thereof. The foregoing description is of the preferred embodiments and is by way of example only, and is not to limit the scope of the invention.

What is claimed is:

1. An exhaust system for a controlled atmosphere treatment apparatus having at least one internal zone with predetermined atmospheric conditions therein and an exhaust stack for a predetermined exhaust flow from said zone, the system comprising:

a metering device attached in fluid communication with the exhaust stack, the metering device having a converging entrance portion defining an inlet, a reduced diameter outlet portion defining an outlet, and a predetermined relationship between the inlet and outlet flow for measuring at the metering device the flow therethrough; suction means attached to communicate with the metering device outlet for drawing exhaust flow through the metering device; and suction control means responsive to the measured flow through the metering device and operably associated with the suction means for maintaining the outlet flow in the metering device such that the inlet flow thereto is generally equal to the predetermined exhaust flow from said internal zone.

2. An exhaust system as claimed in claim 1 wherein the metering device is a nozzle-type fluid flow meter.

3. An exhaust system as claimed in claim 2 wherein the flow meter conforms to the standard for ASME long-radius flow nozzles.

4. An exhaust system as claimed in claim 1 and further comprising a flow conduit coupled between the metering device outlet and the suction means, the flow conduit being dimensioned to maintain the flow velocity from the metering device outlet to prevent precipitation of particulate matter.

5. An exhaust system as claimed in claim 4 wherein the suction control means includes a valve located in the suction flow conduit to control the suction applied to the metering device.

6. An exhaust system as claimed in claim 1 and further comprising a filter located between the metering device and the suction means.

7. An exhaust system as claimed in claim 6 wherein the suction means is an exhaust fan.

8. An exhaust system as claimed in claim 1 and further comprising means for measuring flow through the metering device including pressure taps located in the entrance and outlet portions for determining the differential pressure between the metering device inlet and outlet.

9. An exhaust system as claimed in claim 1 wherein the metering device is a venturi type fluid flow meter.

10. An exhaust system as claimed in claim 1 wherein the metering device is an orifice plate type fluid flow meter.

11. An exhaust system as claimed in claim 1 wherein the controlled atmosphere treatment apparatus has an entrance opening and an exit opening, and further comprising a fume hood surrounding one of the entrance and exit openings, the fume hood defining a narrow entrance slot to minimize withdrawal of the controlled atmosphere through the entrance opening.

12. An exhaust system as claimed in claim 11 wherein the fume hood has an exhaust outlet, the exhaust outlet being connected to the suction means downstream of the metering device.

13. An exhaust system as claimed in claim 1 wherein the controlled atmosphere treatment apparatus has a plurality of controlled atmosphere zones therein, each zone having its own exhaust stack for a respective predetermined exhaust flow therethrough, wherein said metering device is attached to one of said exhaust stacks, and further comprising a plurality of like metering devices, one of said devices being attached to each exhaust stack, said flow measurement means being coupled to each metering device, the suction means being attached to communicate with each metering device, and suction control means operably associated with each metering device for maintaining the flow rate therethrough generally equal to the predetermined flow rate in its respective exhaust stack.

14. An exhaust system as claimed in claim 3 and further comprising a filter located between the metering device and the suction means.

15. An exhaust system as claimed in claim 3 and further comprising means for measuring flow through the metering device including pressure taps located in the entrance and outlet portions for determining the differential pressure between the metering device inlet and outlet.

16. A method of capturing emissions from a controlled atmosphere treatment apparatus of the type having an internal zone with predetermined atmospheric conditions therein and an exhaust stack for a predetermined exhaust flow from said zone, the method comprising the steps of:

providing a flow meter in communication with the exhaust stack to increase the exhaust flow velocity while maintaining constant the mass flow rate through the exhaust stack; sensing the flow at the flow meter to produce measurements for control of the flow through the exhaust stack such that the exhaust stack flow is generally equal to the predetermined exhaust flow from said zone; delivering the increased velocity flow from the flow meter to a remote location; maintaining the temperature of the exhaust flow during the delivery step and controlling the velocity of the exhaust flow so as to prevent condensation and precipitation of volatiles and particulate matter from the exhaust flow.

17. A method as claimed in claim 16 wherein the increased velocity flow from the flow meter is delivered to a remote location by providing a closed conduit coupled to the flow meter, and applying a suction to the closed conduit.

18. A method as claimed in claim 17 wherein the velocity of the exhaust flow during the delivery step is maintained by adjusting the suction applied through the closed conduit.

* * * * *